(12) United States Patent
Kroner et al.

(10) Patent No.: US 6,846,882 B2
(45) Date of Patent: Jan. 25, 2005

(54) METHOD FOR MODIFYING ACID GROUP CONTAINING POLYMERS

(75) Inventors: Matthias Kroner, Eisenberg (DE); Johannes Perner, Neustadt (DE); Karl-Heinz Büchner, Altlussheim (DE); Jochen Wild, Ruppertsberg (DE); Jürgen Pfister, Speyer (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 121 days.

(21) Appl. No.: 10/239,053

(22) PCT Filed: Mar. 27, 2001

(86) PCT No.: PCT/EP01/03465
§ 371 (c)(1),
(2), (4) Date: Sep. 19, 2002

(87) PCT Pub. No.: WO01/72853
PCT Pub. Date: Oct. 4, 2001

(65) Prior Publication Data
US 2003/0050404 A1 Mar. 13, 2003

(30) Foreign Application Priority Data
Mar. 29, 2000 (DE) .......................... 100 15 135

(51) Int. Cl.⁷ ................................. C08F 8/14
(52) U.S. Cl. .................... 525/330.1; 525/384
(58) Field of Search .............. 525/330.1, 384

(56) References Cited

U.S. PATENT DOCUMENTS 3,475,391 A   10/1969  Coker
5,336,728 A * 8/1994  Humphries et al. ...... 525/328.2

FOREIGN PATENT DOCUMENTS

| | | |
|---|---|---|
| DE | 44 45 569 | 6/1995 |
| DE | 44 19 568 | 12/1995 |
| EP | 0 116 930 | 8/1984 |
| EP | 0 349 810 | 1/1990 |
| FR | 2 590 261 | 5/1987 |
| GB | 1 206 711 | 9/1970 |
| JP | 62 236807 | 10/1987 |
| WO | 95 09821 | 4/1995 |
| WO | 97 00898 | 1/1997 |

* cited by examiner

Primary Examiner—Bernard Lipman
(74) Attorney, Agent, or Firm—Oblon, Spivak, McClelland, Maier & Neustadt, P.C.

(57) ABSTRACT

Polymers containing acid groups are modified by reaction of (a) polymers which comprise at least 5% by weight of a copolymerized monoethylenically unsaturated monomer containing acid groups, have molar masses of from 200 to 100,000 and are obtainable by free-radical polymerization of monoethylenically unsaturated acids in aqueous solution in the presence or absence of other monoethylenically unsaturated monomers and in the presence of at least 4% by weight, based on the monomers used in the polymerization, of a water-soluble sulfur compound in which the sulfur is in the oxidation state +4, with (b) polyalkylene glycols which are end-capped at one end, alkylpolyalkylene glycol amines or mixtures thereof, or mixtures of at least one of the two compounds specified with up to 30% by weight, based on the mixtures, of ammonia, amines, alcohols, hydroxycarboxylic acids or aminocarboxylic acids at up to 250° C.

15 Claims, No Drawings

METHOD FOR MODIFYING ACID GROUP CONTAINING POLYMERS

The present invention relates to a process for modifying polymers containing acid groups by reaction of (a) polymers comprising at least 5% by weight of a copolymerized monoethylenically unsaturated monomer containing acid groups and having molar masses of from 200 to 100,000, with (b) polyalkylene glycols which are end-capped at one end, alkylpolyalkylene glycol amines or mixtures thereof, or mixtures of at least one of the two compounds specified with up to 30% by weight, based on the mixtures, of ammonia, amines, alcohols, hydroxycarboxylic acids or aminocarboxylic acids at up to 250° C.

U.S. Pat. No. 5,840,114 discloses a cement mixture comprising a calcium salt and a copolymer containing polyalkylene oxide side chains which are bound to the main chain via an amide or imide group. Such copolymers are prepared, for example, by reacting polyacrylic acid having a molar mass of 5000 with polyalkylene glycols which are end-capped at one end and alkoxylated amines by heating to temperatures in the range of 140–185° C. in the presence of p-toluenesulfonic acid as catalyst.

The reaction of polymers containing carboxyl groups with polyalkylene glycols which are end-capped at one end and alkylpolyalkylene glycol amines is known from U.S. Pat. No. 5,728,207 and WO-A-98/31643. The effectiveness of the modified polymers obtainable in this way as dispersants for cement is still in need of improvement.

It is an object of the present invention to provide particularly effective dispersants by modification of polymers containing acid groups for cement slurries.

We have found that this object is achieved by a process for modifying polymers containing acid groups by reaction of (a) polymers comprising at least 5% by weight of a copolymerized monoethylenically unsaturated monomer containing acid groups and having molar masses of from 200 to 100,000 with (b) polyalkylene glycols which are end-capped at one end, alkylpolyalkylene glycol amines or mixtures thereof, or mixtures of at least one of the two compounds specified with up to 30% by weight, based on the mixtures, of ammonia, amines, alcohols, hydroxycarboxylic acids or aminocarboxylic acids at up to 250° C., when the polymers used as component (a) are ones which are obtainable by free-radical polymerization of monoethylenically unsaturated acids in aqueous solution in the presence or absence of other monoethylenically unsaturated monomers and in the presence of at least 4% by weight, based on the monomers used in the polymerization, of a water-soluble sulfur compound in which the sulfur is in the oxidation state +4. Such water-soluble sulfur compounds are, for example, sulfur dioxide, sulfurous acid, alkali metal, alkaline earth metal and ammonium salts of sulfurous acid or of disulfurous acid, sodium, potassium, calcium or ammonium formaldehyde sulfoxylate, dialkyl sulfites or mixtures thereof. Among these compounds, particular preference is given to using potassium, ammonium or calcium sulfite, sodium, potassium, calcium or ammonium disulfite, sodium, potassium, calcium or ammonium hydrogensulfite or mixtures thereof.

The polymers of component (a) are obtainable by polymerization of monoethylenically unsaturated monomers containing acid groups. These monomers can be polymerized either alone, in admixture with one another or, if desired, together with other monoethylenically unsaturated monomers. Apart from the monomers containing free acid groups, it is also possible to use the alkali metal, alkaline earth metal or ammonium salts of the monomers containing acid groups. The monomers containing acid groups can be completely neutralized or only partially neutralized, e.g. to an extent of 1–90%. Suitable monomers containing acid groups are, for example, acrylic acid, methacrylic acid, maleic acid, maleic anhydride, fumaric acid, vinylsulfonic acid, allylsulfonic acid, methallylsulfonic acid, styrenesulfonic acid, acrylamido-2-methylpropanesulfonic acid, mixture of acrylic acid and methacrylic acid and mixtures of acrylic acid and methacrylic acid [sic].

According to the present invention, the monomers containing acid groups are polymerized in an aqueous medium at 80–150° C., preferably from 20 to 120° C., in the presence of water-soluble sulfur compounds in which the sulfur is in the oxidation state +4. The polymerization can be carried out under atmospheric pressure, under superatmospheric pressure or under subatmospheric pressure. Polymerization under superatmospheric pressure is appropriate in cases in which volatile constituents are to remain in the system, e.g. when sulfur dioxide is used as regulator or the polymerization is carried out at temperatures above the boiling point of water. The polymerization is advantageously carried out under an inert gas atmosphere. It can, for example, be carried out by metering liquid monomers such as acrylic acid or methacrylic acid without diluent, solid monomers such as maleic acid or sodium vinylsulfonate and initiators and regulators in the form of 50–60% strength by weight aqueous solutions into the reactor over a period of 1–10 hours at such a rate that the heat of polymerization can be satisfactorily removed. The concentration of the starting materials is advantageously chosen so that 30–70% strength by weight aqueous solutions of the polymers containing acid groups are obtained after the polymerization. The polymers may be present in neutralized or partially neutralized form. The pH of this solution is, for example, 1–7, preferably from 1 to 4.

Neutralization of the polymers containing acid groups can be carried out during or after the polymerization. In addition, it is possible to use monomers containing acid groups which have already been partially or completely neutralized. The sodium, potassium, calcium, magnesium or ammonium salts of the polymers containing acid groups are of particular industrial interest. In many cases, partial neutralization of the polymers containing acid groups is advantageous for storage, because partially neutralized polymers containing acid groups are more readily soluble in water and thus make it possible to prepare more highly concentrated solutions. If partially neutralized polymers containing acid groups are used, the degree of neutralization is, for example, 1–50 mol %, preferably 5–25 mol %, of the acid groups. However, polycarboxylic acids in the unneutralized form, i.e. in the acid form, can also be used as component (a). Should precipitation occur during the storage of highly concentrated aqueous polyacids, the precipitates can be redissolved by dilution with water or by storage at, for example, 40–100° C. Aqueous solutions of polymers containing acid groups in the acid form, the partially neutralized form or the completely neutralized form can be dried by evaporation of the water. Depending on the drying conditions, powders, granules, flakes or pellets are obtained.

As component (a), use is made, for example, of homopolymers or copolymers of acrylic acid, methacrylic acid, maleic acid, maleic anhydride, vinylsulfonic acid, acrylamidomethyl-propanesulfonic acid, methallylsulfonic acid or the alkali metal or ammonium salts of the polymers. Further examples of polymers containing acid groups are copolymers of 5–95% by weight of acrylic acid, methacrylic acid, maleic acid, vinylsulfonic acid, acrylamidomethyl-propanesulfonic acid, methallylsulfonic acid and/or their alkali metal or ammonium salts and 95–5% by weight of acrylic, methacrylic or maleic esters of monohydric alcohols having 1–8 carbon atoms in the molecule. Polymers which are particularly preferred as component (a) are homopolymers of acrylic acid and methacrylic acid, copolymers of acrylic acid and methacrylic acid, copolymers of methacrylic acid and vinylsulfonic acid, copolymers of acrylic acid and maleic acid, copolymers of methacrylic acid and maleic acid, copolymers of acrylic acid and an ester of a monoethylenically unsaturated carboxylic acid, copolymers of methacrylic acid and an ester of a monoethylenically unsaturated carboxylic acid and the alkali metal or ammonium salts of the copolymers mentioned. The molar mass of the polymers of component (a) is 200–100,000, preferably from 1000 to 10,000. Particular preference is given to homopolymers of acrylic acid or methacrylic acid or copolymers of methacrylic acid and acrylic acid.

Specific examples of polymers containing acid groups (the percentages are by weight) are:

polyacrylic acid having a molecular weight of 2000,
polyacrylic acid having a molecular weight of 4000,
polyacrylic acid having a molecular weight of 8000,
polyacrylic acid having a molecular weight of 20,000,
copolymer of 70% of acrylic acid and 30% of maleic acid having a molecular weight of 70,000,
copolymer of 50% of acrylic acid and 50% of maleic acid having a molecular weight of 5000,
copolymer of 70% of methacrylic acid and 30% of maleic acid having a molecular weight of 5000,
copolymer of 70% of acrylic acid and 30% of methacrylic acid having a molecular weight of 10,000,
copolymer of 90% of acrylic acid and 10% of vinylsulfonic acid having a molecular weight of 10,000,
copolymer of 50% of acrylic acid and 50% of methacrylic acid having a molecular weight of 6000,
copolymer of 20% of acrylic acid and 80% of methacrylic acid having a molecular weight of 5000,
copolymer of 80% of acrylic acid and 20% of methacrylic acid having a molecular weight of 4000,
terpolymer of 40% of acrylic acid, 40% of methacrylic acid and 20% of maleic acid having a molecular weight of 5000.

Possible compounds of component (b) are polyalkylene glycols which are end-capped at one end, alkylpolyalkylene glycol amines and mixtures of at least one of the compounds specified with up to 30% by weight, based on the mixtures, of ammonia, amines, alcohols, hydroxycarboxylic acids or aminocarboxylic acids. Polyalkylene glycols which are end-capped at one end can be represented, for example, by the formulae

$$R^1-(O-CHR^2-CHR^3)_n-OH \quad (I)$$

or

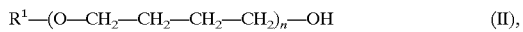

$$R^1-(O-CH_2-CH_2-CH_2-CH_2)_n-OH \quad (II),$$

where
$R^1=C_1-C_{50}$-alkyl,
$R^2$, $R^3$=H, methyl or ethyl and
n=1 to 230.

The molecular weight of the alkylpolyalkylene glycols can be up to 10,000; preference is given to a molecular weight of from 200 to 2000. This corresponds to up to 230, preferably from 3 to 40, alkylene oxide units per molecule.

Examples of alkylpolyalkylene glycols are:

methylpolyethylene glycol having a molecular weight of 350 methylpolyethylene glycol having a molecular weight of 500 methylpolyethylene glycol having a molecular weight of 750 methylpolyethylene glycol having a molecular weight of 1000 methylpolyethylene glycol having a molecular weight of 1500 methylpolyethylene glycol having a molecular weight of 2000 methylpolyethylene glycol having a molecular weight of 5000 butylpolyethylene glycol having a molecular weight of 10,000 isodecylpolyethylene glycol having a molecular weight of 1000.

The alkylpolyalkylene glycols may also comprise propylene oxide or butylene oxide, either alone or in combination with ethylene oxide. The combinations can be blockwise or random.

Examples of block polymers which are obtainable by initial addition of ethylene oxide onto one mole of methanol and subsequent addition of propylene oxide onto the ethylene oxide adduct are:

methylpolyalkylene glycol from 5 mole of ethylene oxide and 1 mole of propylene oxide methylpolyalkylene glycol from 5 mole of ethylene oxide and 3 mole of propylene oxide methylpolyalkylene glycol from 5 mole of ethylene oxide and 10 mole of propylene oxide methylpolyalkylene glycol from 10 mole of ethylene oxide and 1 mole of propylene oxide methylpolyalkylene glycol from 10 mole of ethylene oxide and 3 mole of propylene oxide methylpolyalkylene glycol from 10 mole of ethylene oxide and 10 mole of propylene oxide methylpolyalkylene glycol from 20 mole of ethylene oxide and 1 mole of propylene oxide methylpolyalkylene glycol from 20 mole of ethylene oxide and 3 mole of propylene oxide methylpolyalkylene glycol from 20 mole of ethylene oxide and 10 mole of propylene oxide methylpolyalkylene glycol from 25 mole of ethylene oxide and 1 mole of propylene oxide butyl alcohol alkoxylate from 25 mole of ethylene oxide and 3 mole of propylene oxide lauryl alcohol alkoxylate from 25 mole of ethylene oxide and 10 mole of propylene oxide It is also possible to use polytetrahydrofuran which bears, for example, a $C_1$–$C_4$-alkyl group as end group at one end and has a molar mass of from 200 to 5000.

The abovementioned alkylpolyalkylene glycols can be aminated, for example by reaction with ammonia at elevated temperatures and under superatmospheric pressure in the presence of a catalyst, to convert the terminal OH groups into terminal amino groups. This forms, for example, 80–100% of primary amino groups, from 0 to 20% by weight of secondary amino groups and from 0 to 10% by weight of tertiary amino groups.

Alkylpolyalkylene glycol amines of the group (b) which are suitable for the reaction with the polymers (a) can also be prepared by addition of alkylpolyalkylene glycols onto the double bond of acrylonitrile and subsequent hydrogenation of the nitrile group to an amino group.

Compounds of the group (b) are, for example:
methylpolyethylene glycol amine from 3 ethylene oxide,
methylpolyethylene glycol amine from 7 ethylene oxide,
methylpolyethylene glycol amine from 10 ethylene oxide,
methylpolyethylene glycol amine from 20 ethylene oxide,
methylpolyethylene glycol amine from 30 ethylene oxide,
methylpolyethylene glycol amine from 50 ethylene oxide,
methylpolyethylene glycol amine from 5 ethylene oxide and 1 propylene oxide,
methylpolyethylene glycol amine from 10 ethylene oxide and 1 propylene oxide,
methylpolyethylene glycol amine from 10 ethylene oxide and 3 propylene oxide,
methylpolyethylene glycol amine from 10 ethylene oxide and 10 propylene oxide,
methylpolyethylene glycol amine from 20 ethylene oxide and 1 propylene oxide,
methylpolyethylene glycol amine from 20 ethylene oxide and 3 propylene oxide,
methylpolyethylene glycol amine from 20 ethylene oxide and propylene oxide,
methylpolyethylene glycol amine from 30 ethylene oxide and 5 propylene oxide,
methylpolyethylene glycol amine from 40 ethylene oxide and 10 propylene oxide, and
methylpolyethylene glycol amine from 50 ethylene oxide and 1 propylene oxide.

The mono-end-capped polyethylene glycols of the formulae I and II and the alkylpolyalkylene glycol amines can be used together with ammonia or amines in the preparation of the modified polymers containing acid groups. Suitable amines are, for example, alkylamines having molar masses of up to 2000 or $C_{30}$-dialkylamines having molar masses of up to 5000. Specific examples of such amines are ethylamine, butylamine, hexylamine, octylamine, stearylamine, tallow fatty amine and palmitylamine. It is also possible to use long-chain amines such as polyisobuteneamines having molar masses of, for example, 500, 1000 or 2000. The fatty amines may also be unsaturated, e.g. oleylamine. Examples of further amines are 2-methoxyethylamine, 2-methoxypropylamine, 3-methoxypropylamine, 2-ethoxypropylamine, 3-ethoxypropylamine, 2-(2-methoxyethoxy)propylamine, 3-(2-methoxyethoxy)propylamine. Further possible amines are alkoxylated alkylamines or alkoxylated dialkylamines, for example reaction products of 1 mole of oleylamine with 20 mole of ethylene oxide or reaction products of 1 mole of stearylamine with 1 mole of ethylene oxide and 2 mole of propylene oxide or reaction products of 1 mole of tallow fatty amine with 1 mole of butylene oxide and 5 mole of ethylene oxide. Amino alcohols in combination with, for example, polyalkylene glycols which are end-capped at one end are also suitable for the modification. Examples of such amino alcohols are ethanolamine, diethanolamine and N,N-dimethylethanolamine.

Apart from ammonia and amines, it is also possible to use alcohols in admixture with polyalkylene glycols which are end-capped at one end or alkylpolyalkylene glycol amines for modifying the polymers of component (a).

Suitable alcohols are, for example, $C_1$–$C_{50}$-alcohols. Examples are methanol, ethanol, isopropanol, n-propanol, butanol, hexanol, cyclohexanol, dodecanol, tridecanol, 2-ethylhexyl alcohol, hexadecanol, octadecanol, palmityl alcohol, stearyl alcohol, behenyl alcohol and tallow fatty alcohol. It is also possible to use unsaturated alcohols such as oleyl alcohol. Natural alcohols or alcohols prepared by the Ziegler process or oxo alcohols can be used. The alcohols can be linear or branched.

In place of the alcohols, hydroxycarboxylic acids can also be used in the above-described mixtures. Examples are glycolic acid, lactic acid, citric acid, isocitric acid, tartaric acid and malic acid. This group of compounds also includes lactones such as caprolactone.

A further group of compounds which can be used together with polyalkylene glycols which are end-capped at one end and/or alkylpolyalkylene glycol amines for modifying the polymers of component (a) are amino acids. Examples of such compounds are glycine, alanine, aspartic acid, glutamic acid, glutamine, lysine, arginine, 4-aminobutyric acid, 6-aminocaproic acid, 11-aminoundecanoic acid and lactams such as caprolactam. Taurine is also suitable.

Examples of reactions of polymers (a) with compounds of the group (b), i.e. the polyalkylene glycols which are end-capped at one end, alkylpolyalkylene glycol amines or mixtures thereof or mixtures of at least one of the two compounds specified with up to 20% by weight, based on the mixtures, of ammonia, amines, alcohols, hydroxycarboxylic acids or aminocarboxylic acids, are:

15% by weight of polyacrylic acid, 80% by weight of methylpolyethylene glycol and 5% by weight of methylpolyethylene glycol amine 30% by weight of polyacrylic acid, 65% by weight of methylpolyethylene glycol and 5% by weight of methylpolyethylene glycol amine 40% by weight of polyacrylic acid, 55% by weight of methylpolyethylene glycol and 5% by weight of methylpolyethylene glycol amine 10% by weight of polyacrylic acid, 70% by weight of methylpolyethylene glycol and 20% by weight of methylpolyethylene glycol amine 15% by weight of polymethacrylic acid, 80% by weight of methylpolyethylene glycol and 5% by weight of methylpolyethylene glycol amine 15% by weight of copolymer of acrylic acid and methacrylic acid, 80% by weight of methylpolyethylene glycol and 5% by weight of methylpolyethylene glycol amine 15% by weight of copolymer of acrylic acid and maleic acid, 80% by weight of methylpolyethylene glycol and 5% by weight of methylpolyethylene glycol amine 10% by weight of polyacrylic acid and 90% by weight of methylpolyethylene glycol 15% by weight of copolymer of methacrylic acid and maleic acid, 80% by weight of methylpolyethylene glycol and 5% by weight of methylpolyethylene glycol amine 20% by weight of polyacrylic acid and 80% by weight of methylpolyethylene glycol 30% by weight of polyacrylic acid and 70% by weight of methylpolyethylene glycol 40% by weight of polyacrylic acid and 60% by weight of methylpolyethylene glycol.

It is also possible to use 2 or more alkylpolyalkylene glycols of group (b) for the reaction with one or more of the polycarboxylic acids of group (a), for example:

10% by weight of polyacrylic acid, 45% by weight of methylpolyethylene glycol having a molar mass of 500 and 45% by weight of methylpolyethylene glycol having a molar mass of 2000

20% by weight of polymethacrylic acid, 30% by weight of methylpolyethylene glycol having a molar mass of 500 and 50% by weight of methylpolyethylene glycol having a molar mass of 1000

30% by weight of polyacrylic acid, 20% by weight of methylpolyethylene glycol having a molar mass of 300 and 50% by weight of methylpolyethylene glycol having a molar mass of 4000

40% by weight of polyacrylic acid, 10% by weight of methylpolyethylene glycol having a molar mass of 500 and 50% by weight of methylpolyethylene glycol having a molar mass of 2000

20% by weight of polymethacrylic acid, 30% by weight of methylpolyethylene glycol having a molar mass of 1000 and 50% by weight of methylpolyethylene glycol having a molar mass of 5000

20% by weight of copolymer of acrylic acid and methacrylic acid in a weight ratio of 1:1, 30% by weight of methylpolyethylene glycol having a molar mass of 500 and 50% by weight of methylpolyethylene glycol having a molar mass of 1000

20% by weight of copolymer of acrylic acid and methacrylic acid in a weight ratio of 1:9, 60% by weight of methylpolyethylene glycol having a molar mass of 500 and 20% by weight of methylpolyethylene glycol having a molar mass of 1000

20% by weight of copolymer of acrylic acid and maleic acid in a weight ratio of 3:7, 50% by weight of methylpolyethylene glycol having a molar mass of 500 and 30% by weight of methylpolyethylene glycol having a molar mass of 2000

10% by weight of polyacrylic acid, 10% by weight of copolymer of acrylic acid and methacrylic acid in a weight ratio of 3:7, 50% by weight of methylpolyethylene glycol having a molar mass of 500 and 30% by weight of methylpolyethylene glycol having a molar mass of 2000

20% by weight of polymethacrylic acid, 10% by weight of copolymer of acrylic acid and methacrylic acid in a weight ratio of 7:3, 30% by weight of methylpolyethylene glycol having a molar mass of 500 and 50% by weight of methylpolyethylene glycol having a molar mass of 2000

10% by weight of polyacrylic acid and 90% by weight of methylpolyethylene glycol amine 20% by weight of polyacrylic acid and 80% by weight of methylpolyethylene glycol amine 30% by weight of polyacrylic acid and 70% by weight of methylpolyethylene glycol amine 40% by weight of polyacrylic acid and 60% by weight of methylpolyethylene glycol amine 20% by weight of polyacrylic acid, 74% by weight of methylpolyethylene glycol, 5% by weight of methylpolyethylene glycol amine and 1% by weight of ammonia 20% by weight of polyacrylic acid, 75% by weight of methylpolyethylene glycol, 5% by weight of 2-methoxyethylamine 20% by weight of polyacrylic acid, 75% by weight of methylpolyethylene glycol, 5% by weight of 2-methoxypropylamine 15% by weight of polyacrylic acid, 80% by weight of methylpolyethylene glycol, 5% by weight of 2-methoxypropylamine 15% by weight of polyacrylic acid, 80% by weight of methylpolyethylene glycol, 5% by weight of 3-methoxypropylenamine 20% by weight of polyacrylic acid, 70% by weight of methylpolyethylene glycol, 10% by weight of 3-(2-methoxyethoxy)propylamine and 20% by weight of polyacrylic acid, 70% by weight of methylpolyethylene glycol, 10% by weight of 2-(2-methoxyethoxy)propylamine The molar masses of the polymers (a) and the polyalkylene glycols which are end-capped at one end or alkylpolyalkylene glycol amines (b) mentioned above by way of example are in the range indicated above for the compounds (a) and (b).

The reaction of the components (a) and (b) can be carried out in the presence or absence of catalysts. Catalysts which may be used are, for example, sulfuric acid, p-toluenesulfonic acid, benzenesulfonic acid, methanesulfonic acid, phosphoric acid, phosphorous acid or hydrochloric acid. If an acid acting as catalyst is used in the reaction, it is used in an amount of up to 10% by weight, preferably up to 5% by weight, based on the components (a) and (b).

The weight ratio in which the compounds of groups (a) and (b) are reacted can be from 99:1 to 1:99. The components (a) and (b) are preferably reacted in a weight ratio of from 50:50 to 5:95, particularly preferably from 30:70 to 10:90.

The reaction is carried out, for example, by admixing the aqueous solutions of the component (a) with, if desired, an acid acting as catalyst and with a compound of the component (b) and distilling off the water. The water is usually distilled from the mixture under atmospheric pressure, but can also be carried out under reduced pressure. It is often advantageous to pass a stream of gas through the reaction mixture during the distillation in order to remove the water and other volatile constituents more quickly. As stream of gas, it is possible to use air, nitrogen or steam. However, it is also possible for the water to be removed under reduced pressure and for a stream of gas to be passed through the reaction mixture in addition. To distill the water from the reaction mixture, energy has to be supplied to the mixture. Suitable apparatuses for this purpose are heatable stirred vessels, stirred vessels with external heat exchangers, stirred vessels with internal heat exchangers, thin film evaporators, kneaders and extruders. The water which vaporizes is taken from the reaction medium via a vapor line and is condensed in a heat exchanger. It contains only small amounts of organic constituents and can be disposed of via a water treatment plant.

Subsequent to or simultaneously with the removal of water from the reaction mixture, a condensation reaction between the compounds of the components (a) and (b) occurs. The water formed in this condensation reaction is likewise removed from the reaction medium. The modification of the compound of component (a) is carried out at, for example, from 100 to 250° C. This temperature depends on the reaction apparatus and the residence time. If, for example, the condensation is carried out in a continuously operated extruder or thin film evaporator in which the residence time is only a few seconds or minutes, it is advantageous to employ temperatures in the range from 150 to 250° C. In batchwise operation in stirred vessels or kneaders, the residence time required is, for example, 1–15 hours and the condensation is usually carried out in the temperature range of 100–200° C.

In one process variant, the polymers (a) containing acid groups can be dewatered first and the resulting powder or granulated material can be condensed with at least one compound of component (b).

After the condensation, the reaction mixture is cooled and, if appropriate, dissolved in water. Aqueous solutions of the reaction mixture can be prepared, for example, by adding water to the reaction mixture still at 50–150° C. while stirring or by stirring the liquid reaction mixture at 50–150° C. into water. It is usual to employ such an amount of water that a 20–95% strength by weight, preferably 30–50% strength by weight, aqueous solution of the modification product is obtained. Simultaneously with or subsequent to the dissolution of the condensation product, neutralization of the remaining acid groups can be carried out if desired. As neutralization agents, use is made of alkali metal or alkaline earth metal oxides or hydroxides in solid form or in the form of 10–50% strength aqueous solutions or slurries in water. Examples of suitable bases are lithium hydroxide, sodium hydroxide, potassium hydroxide, calcium oxide, calcium hydroxide, magnesium oxide, magnesium hydroxide, aluminum oxide and aluminum hydroxide. Depending on the degree of neutralization, the aqueous solutions of the modified polycarboxylic acids can have pH values in the range from 1 to 7.

The reaction mixture can also remain undiluted after the condensation. On cooling to below 60° C., it crystallizes to a waxy mass which can readily be melted again. This results in varying possibilities for transport. For example, the reaction mixture can be packed in drums from which the condensation product can be melted again. It can also be transported and stored in the molten state at above 60° C., preferably at from 80 to 120° C. Heatable and thermally insulated tankers are suitable for this. The melt can be stored in heated storage containers at from 80 to 120° C. However, it is also possible to prepare a 60–90% strength aqueous solution and to handle this. The viscosities of such solutions are, for example, from 1000 to 100,000 mPas. Addition of from 1 to 40% by weight of water to the melt can reduce the softening temperature. Thus, a condensation product without water melts, for example, at 50° C., with 5% of water at 45° C. and with 10% of water at only 30° C. Addition of 20–40% by weight of water allows the solutions to be readily handled at 20–40° C. This plasticizing action of the water can be advantageous for handling of the melt, since it can reduce the storage temperature and the melt viscosity is also lowered.

The water-free melt can also be mixed with inert powders so as to obtain free-flowing granular material. Inert powders which can be used are, for example, kieselguhr, silica gel, amorphous silicic acid and/or amorphous silicon dioxide.

The aqueous polymer solutions of the modified polymers containing acid groups which can be obtained in this way are used, for example, as dispersants for cement.

The percentages given in the examples are by weight. The K value of the polymers was determined by the method of H. Fikentscher, Cellulose-Chemie, Volume 13, 58–64 and 71–74 (1932), in aqueous solution at a pH of 7, a temperature of 25° C. and a polymer concentration of the sodium salt of the polymers of 1% by weight.

EXAMPLES

Preparation of Aqueous Polycarboxylic Acid Solutions

Polycarboxylic Acid 1

In a 3 liter polymerization reactor, 500 g of water were heated to 100° C. while passing nitrogen through it. As soon as the water boiled, 1200 g of acrylic acid, 300 g of 40% strength aqueous sodium bisulfite solution and 350 g of 10% strength aqueous sodium peroxodisulfate solution were metered in simultaneously over a period of 6 hours. After the addition was complete, the reaction mixture was subjected to post-polymerization for a further one hour and 200 g of 50% strength aqueous solution of sodium hydroxide were then added to give an aqueous solution of partially neutralized polyacrylic acid. The molecular weight of the polyacrylic acid was 4000. The solids content of the polymer solution was adjusted to 50% by dilution with water.

Polycarboxylic Acid 2

In a 4 liter reactor, 1600 g of water were heated to 100° C. while passing nitrogen through it. As soon as the water started to boil, 570 g of acrylic acid, 680 g of methacrylic acid, 250 g of 40% strength sodium bisulfite solution and 500 g of 10% strength sodium peroxodisulfate solution were metered in simultaneously over a period of 7 hours. After the addition was complete, the reaction mixture was polymerized for another one hour by heating at 100° C. The polycarboxylic acid had a molar mass of 5500 and a K value of 31. The solids content of the aqueous polymer solution was 38%.

Example 1

250 g of the 50% strength aqueous polycarboxylic acid 1 having a molecular weight of 4000, 6 g of concentrated sulfuric acid, 50 g of methylpolyethylene glycol amine having a molecular weight of 500 and 550 g of methylpolyethylene glycol having a molar mass of 1000 were placed in a 2 liter reactor provided with an anchor stirrer. The water was subsequently distilled off at 50 mbar. The temperature was then increased to 180° C. and condensation was carried out for 5 hours under reduced pressure. After condensation was complete, the reaction mixture was cooled to 90° C. and 900 g of water and 5 g of 50% strength aqueous sodium hydroxide were added. This gave a 40% strength aqueous polymer solution. The molecular weight $M_w$ of the modified polyacrylic acid was 23,000. The modified polyacrylic acid had a K value of 23.

Example 2

250 g of the polycarboxylic acid 1 were admixed with 20 g of 25% strength aqueous ammonia solution, 550 g of methylpolyethylene glycol having a molar mass of 1000 and 6 g of concentrated sulfuric acid. The mixture was subsequently condensed as described in Example 1, and water and sodium hydroxide were then added to give a 40% strength aqueous solution of the modified polyacrylic acid having a molar mass of 25,000. The K value of the modified polyacrylic acid was 24.

Example 3

Example 2 was repeated except that the condensation was carried out in the absence of ammonia. A 40% strength aqueous polymer solution was obtained. The molecular weight of the modified polyacrylic acid was 20,000, and the K value was 23.

Example 4

Example 2 was repeated except that 50 g of n-butylamine were used in place of the ammonia. The modified polycarboxylic acid 1 had a molar mass of 20,000 and a K value of 24.

Example 5

In a 2 liter reactor, 300 g of the polycarboxylic acid 2 were admixed with 600 g of methylpolyethylene glycol having a molar mass of 1000 and 10 g of concentrated sulfuric acid, the mixture was heated to 160° C. while distilling off water and condensed for 4 hours at this temperature. After cooling and dilution to a solids content of 40%, the reaction mixture was partially neutralized by addition of 10 g of 50% strength aqueous sodium hydroxide. The modified polyacrylic acid had a molar mass of 28,000 and a K value of 32.

Example 6

Example 5 was repeated except that 400 g of methylpolyethylene glycol amine having a molar mass of 500 was used in place of methylpolyethylene glycol. The modified polycarboxylic acid had a molar mass of 22,000 and a K value of 27.

We claim:

1. A process for modifying polymers containing acid groups by reaction of
    (a) polymers comprising at least 5% by weight of a copolymerized monoethylenically unsaturated monomer containing acid groups and having molar masses of from 200 to 100,000 with
    (b) polyalkylene glycols which are end-capped at one end, alkylpolyalkylene glycol amines or mixtures thereof, or mixtures of at least one of the two compounds specified with up to 30% by weight, based on the mixtures, of ammonia, amines, alcohols, hydroxycarboxylic acids or aminocarboxylic acids at up to 250° C., wherein the polymers used as component (a) are ones which are obtained by free-radical polymerization of monoethylenically unsaturated acids in aqueous solution in the presence or absence of other monoethylenically unsaturated monomers and in the presence of at least 4% by weight, based on the monomers used in the polymerization, of a water-soluble sulfur compound in which the sulfur is in the oxidation state +4.

2. A process as claimed in claim 1, wherein the water-soluble sulfur compound used is sulfur dioxide, sulfurous acid, an alkali metal, alkaline earth metal or ammonium salt of sulfurous acid or of disulfurous acid, a sodium, potassium or ammonium formaldehyde sulfoxylate, a dialkyl sulfite or a mixture thereof.

3. A process as claimed in claim 1, wherein the water-soluble sulfur compound used is sodium, potassium or ammonium sulfite, sodium, potassium, calcium or ammonium disulfite, sodium, potassium, calcium or ammonium hydrogensulfite or a mixture thereof.

4. A process as claimed in claim 1, wherein the water-soluble sulfur compound is used in an amount of from 4 to 15% by weight, based on the monomers used in the polymerization.

5. A process as claimed in claim 1, wherein the compounds used in component (a) are homopolymers or copolymers of acrylic acid, methacrylic acid, maleic acid, maleic anhydride, vinylsulfonic acid, acrylamidomethylpropanesulfonic acid, methallylsulfonic acid or alkali metal or ammonium salts of the monomers specified.

6. A process as claimed in claim 1, wherein the component (a) used comprises copolymers of from 5 to 95% by weight of acrylic acid, methacrylic acid, maleic acid, maleic anhydride, vinylsulfonic acid, acrylamidomethylpropanesulfonic acid, methallylsulfonic acid and/or their alkali metal or ammonium salts and from 95 to 5% by weight of acrylic, methacrylic or maleic esters of monohydric alcohols having 1 to 8 carbon atoms in the molecule.

7. A process as claimed in claim 1, wherein the component (a) used comprises homopolymers of acrylic acid, homopolymers of methacrylic acid, copolymers of acrylic acid and methacrylic acid, copolymers of methacrylic acid and vinylsulfonic acid, copolymers of acrylic acid and maleic acid, copolymers of methacrylic acid and maleic acid, copolymers of acrylic acid and an ester of a monoethylenically unsaturated carboxylic acid, copolymers of methacrylic acid and an ester of a monoethylenically unsaturated carboxylic acid and/or alkali metal or ammonium salts of the copolymers specified.

8. A process as claimed in claim 1, wherein the molar mass of the polymers of component (a) is from 1000 to 10,000.

9. A process as claimed in claim 1, wherein the component (a) used comprises homopolymers of acrylic acid or methacrylic acid or copolymers of methacrylic acid and acrylic acid.

10. A process as claimed in claim 1, wherein the component (b) used comprises polyalkylene glycols which are end-capped at one end and have the formula $$R^1\text{---}O\text{---}(CHR^2\text{---}CHR^3\text{---}O)_n H \qquad (I)$$

or $$R^1\text{---}O\text{---}(CH_2\text{---}CH_2\text{---}CH_2\text{---}CH_2\text{---}O)_n\text{---}H \qquad (II), \text{or}$$

where $R^1 = C_1\text{-}C_{50}\text{-alkyl}$, $R^2$, $R^3 =$ H, methyl or ethyl and n=1 to 100.

11. A process as claimed in claim 1, wherein the compounds used in component (b) are methylpolyethylene glycols or methylpolyalkylene glycols comprising ethylene oxide and propylene oxide, in each case having molar masses of from 200 to 10,000.

12. A process as claimed in claim 1, wherein the water-soluble sulfur compound is sodium bisulfite.

13. A method comprising carrying out the process as claimed in claim 1, followed by incorporating modified polymers obtained from said process in a cement slurry.

14. A modified polymer obtained by the process of claim 1.

15. A cement slurry obtained by the method of claim 13.

* * * * *